(12) United States Patent
Takayasu

(10) Patent No.: US 12,050,139 B2
(45) Date of Patent: *Jul. 30, 2024

(54) DISTRIBUTED-SENSOR QUENCH DETECTION METHOD FOR SUPERCONDUCTING DEVICES

(71) Applicant: Massachusetts Institute of Technology, Cambridge, MA (US)

(72) Inventor: Makoto Takayasu, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 875 days.

This patent is subject to a terminal disclaimer.

(21) Appl. No.: 17/075,083

(22) Filed: Oct. 20, 2020

(65) Prior Publication Data

US 2021/0208011 A1 Jul. 8, 2021

Related U.S. Application Data

(60) Provisional application No. 62/973,727, filed on Oct. 21, 2019.

(51) Int. Cl.
*G01K 13/00* (2021.01)
*G01K 5/04* (2006.01)
*G01K 5/28* (2006.01)

(52) U.S. Cl.
CPC .............. *G01K 13/006* (2013.01); *G01K 5/04* (2013.01); *G01K 5/28* (2013.01)

(58) Field of Classification Search
CPC ........... G01K 5/28; G01K 5/04; G01K 13/006
See application file for complete search history.

(56) References Cited

U.S. PATENT DOCUMENTS

| 3,950,606 A | 4/1976 | Schmidt |
| 4,140,021 A | 2/1979 | Nomura et al. |
| 10,571,535 B2 | 2/2020 | Takayasu |
| (Continued) | | |

OTHER PUBLICATIONS

International Search Report and Written Opinion mailed Sep. 14, 2018 in related PCT application No. PCT/US18/38263.

(Continued)

*Primary Examiner* — Paul A Wartalowicz
(74) *Attorney, Agent, or Firm* — NIELDS, LEMACK & FRAME, LLC

(57) ABSTRACT

The present system and method allow for the detection and diagnosis of abrupt changes of a device operating condition using a sensor array disposed in the coolant where the device is located. The purpose of the sensor array is to identify, in real time, abrupt changes quickly and detect the location of the incident. It may be used, for example, for quench detection of superconducting cables and magnets. This system and method are not only limited to use with superconducting conductors such as magnets, power transmission cables, SMES, MRI, motors and generators, but could also be used for any electric devices disposed in liquid or gas. It can also be used for a liquid level meter. Further, this system and method are not limited to low temperature devices, but may also be used in room temperature or elevated higher temperature devices disposed in gas and/or liquid.

20 Claims, 20 Drawing Sheets

(56) References Cited

U.S. PATENT DOCUMENTS

| | | | | |
|---|---|---|---|---|
| 2004/0231429 | A1* | 11/2004 | Niezgorski | E21B 47/007 |
| | | | | 73/800 |
| 2010/0254047 | A1 | 10/2010 | Martchevskii | |
| 2011/0268384 | A1* | 11/2011 | Akkaya | G02B 6/32 |
| | | | | 385/12 |
| 2013/0221979 | A1 | 8/2013 | Tekletsadik et al. | |
| 2013/0225414 | A1 | 8/2013 | Amato et al. | |
| 2014/0177675 | A1* | 6/2014 | Rennie | G01K 5/483 |
| | | | | 374/188 |
| 2016/0287101 | A1* | 10/2016 | Tai | A61B 5/03 |
| 2017/0330653 | A1 | 11/2017 | Lee et al. | |
| 2018/0181249 | A1* | 6/2018 | Li | G06F 3/04142 |
| 2018/0372818 | A1 | 12/2018 | Takayasu | |

OTHER PUBLICATIONS

Chan et al., "Spatial and Temporal Resolution Requirements for Quench Detection in (RE)Ba2Cu3Ox Magnets Using Rayleigh-Scattering-Based Fiber Optic Distributed Sensing", Superconductor Science and Technology, vol. 26, pp. 1-12, 2013.

De Groot et al., "Real-Time Frequency Determination of Acoustic Emission for Different Fracture Mechanisms in Carbon/Epoxy Composites", Composites Science and Technology, vol. 55, pp. 405-412, 1995.

Ishigohka et al., "Method to Detect a Temperature Rise in Superconducting Coils with Piezoelectric Sensors", Applied Physics Letters, vol. 43, pp. 317-318, 1983.

Iwasa, "Hts Magnets: Stability; Protection; Cryogenics; Economics; Current Stability/Protection Activities at FBML", Cryogenics, vol. 43, pp. 303-316, 2003.

Nanato, "Detection of Temperature Rise in YBCO Coil by Time-Frequency Visualization of AE Signals", Physica C, vol. 469, pp. 1808-1810, 2009.

Tsukamoto et al., "Identification of Quench Origins in a Superconductor with Acoustic Emission and Voltage Measurements", Applied Physics Letters, vol. 39, pp. 172-174, 1981.

Tsukamoto et al., "Sources of Acoustic Emission in Superconducting Magnets", Journal of Applied Physics, vol. 54, pp. 997-1007, 1983.

Tsukamoto et al., "Correlation of Acoustic Emission with Normal Zone Occurrence in Epoxy-Impregnated Windings: An Application of Acoustic Emission Diagnostic Technique to Pulse Superconducting Magnets", Applied Physics Letters, vol. 44, pp. 922-924, 1984.

Yoneda et al., "Quench Detection/Protection of an HTS Coil by AE Signals", Physica C, vol. 471, pp. 1432-1435, 2011.

International Search Report and Written Opinion mailed Feb. 17, 2021 in corresponding PCT application No. PCT/US2020/056465.

* cited by examiner

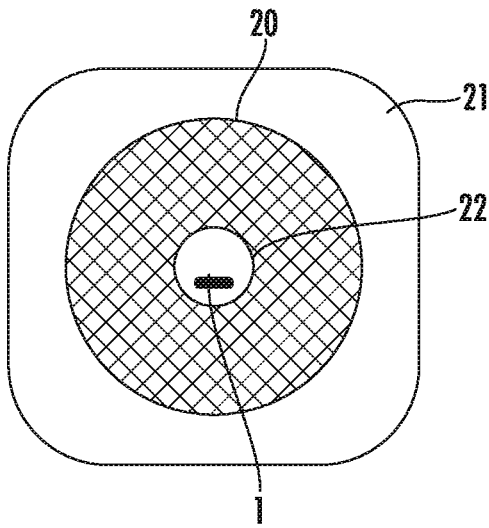
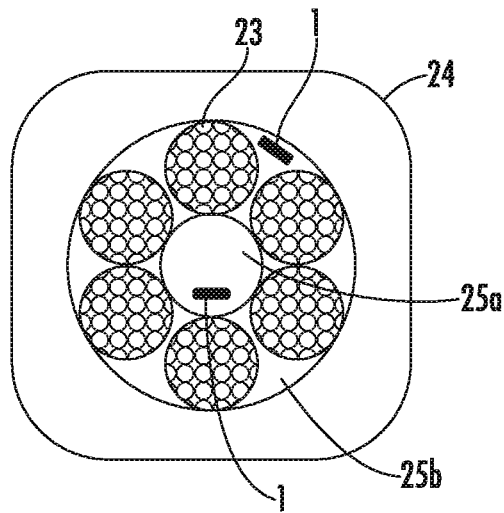
FIG. 5A  FIG. 5B
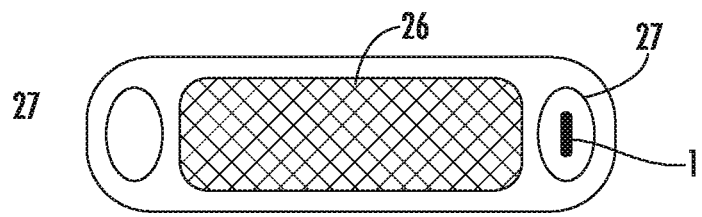
FIG. 5C

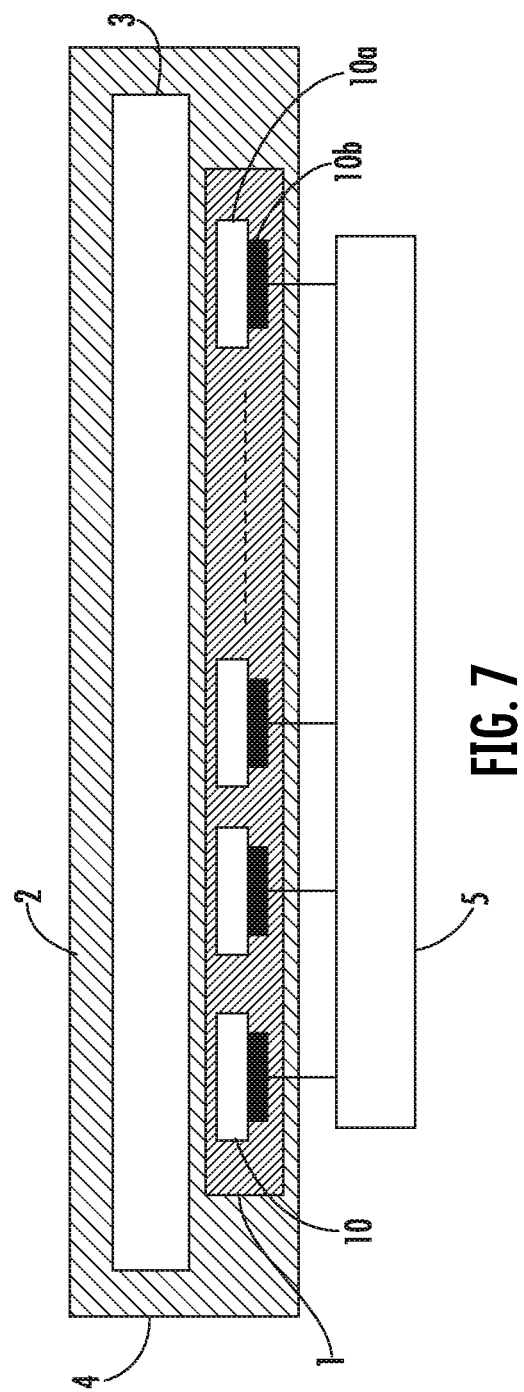

FIG. 10A
FIG. 10B
FIG. 10C
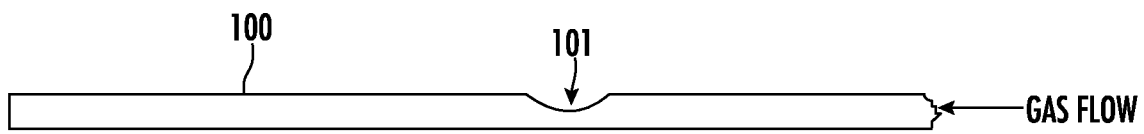
FIG. 10D
FIG. 10E

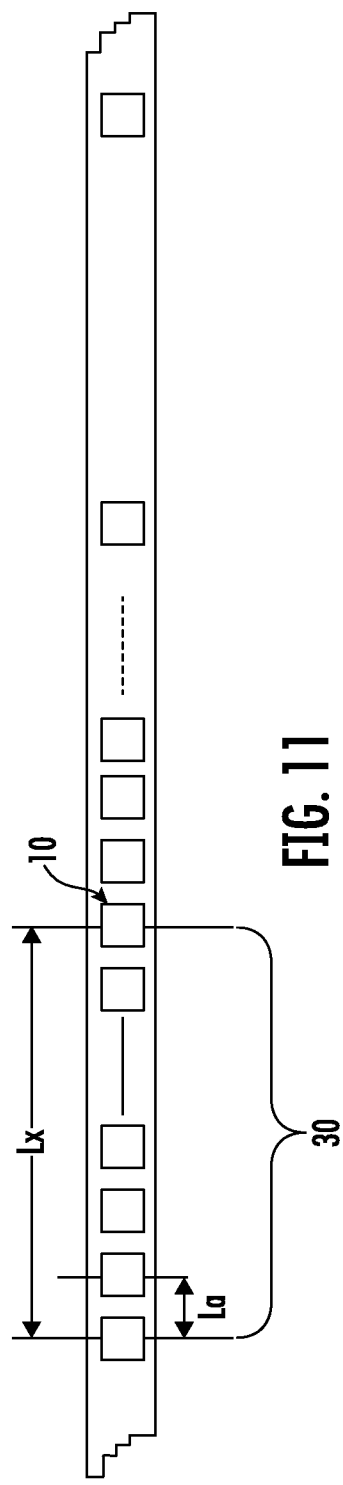

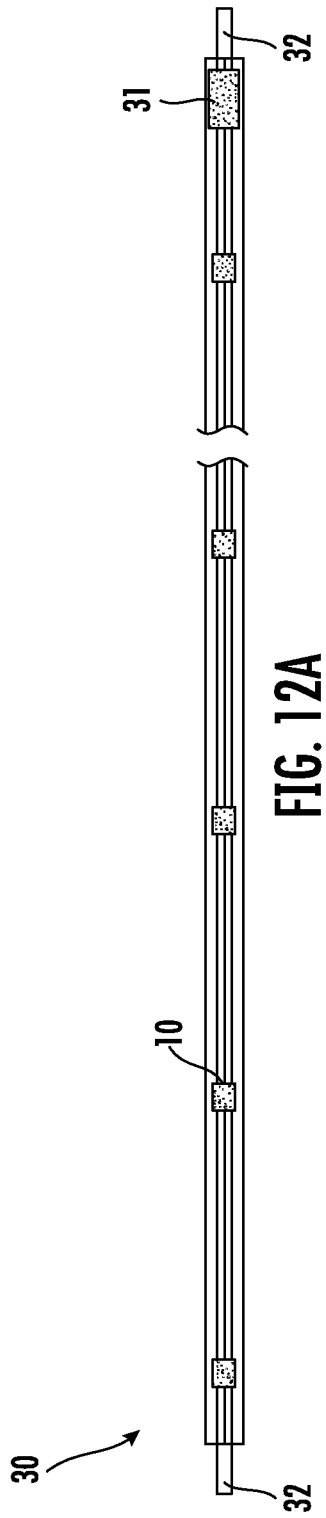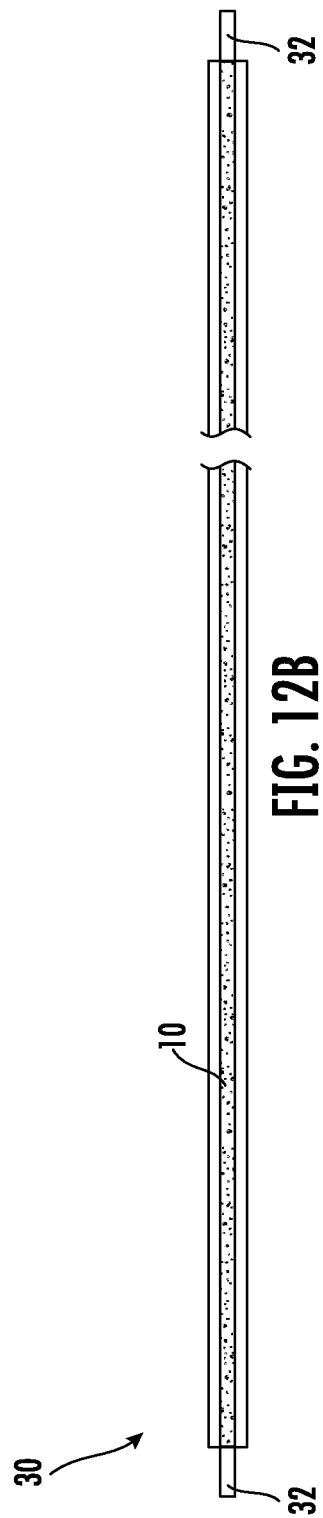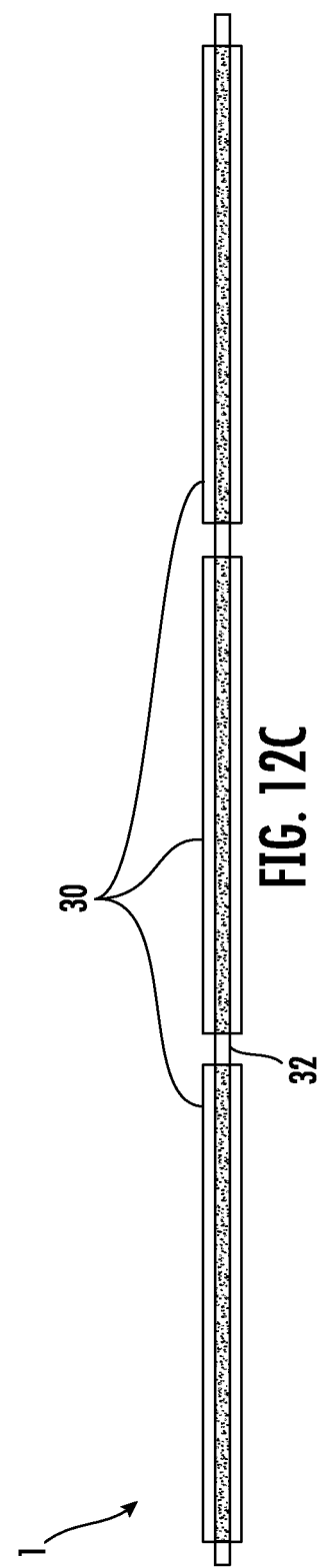

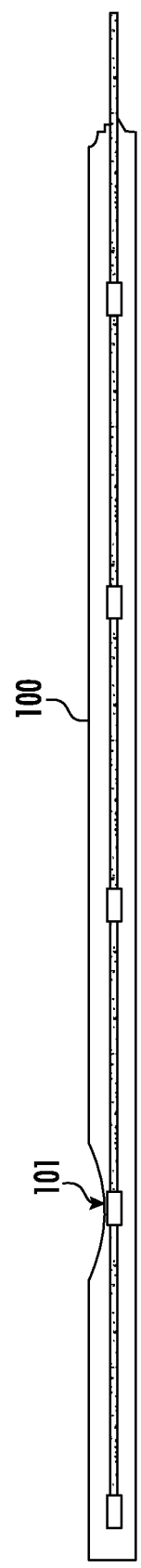

DISTRIBUTED-SENSOR QUENCH DETECTION METHOD FOR SUPERCONDUCTING DEVICES

This application claims priority of U.S. Provisional Patent Application Ser. No. 62/973,727, filed Oct. 21, 2019, and is related to U.S. patent application Ser. No. 16/012,183, issued as U.S. Pat. No. 10,571,535, the disclosures of which are incorporated by reference in their entireties.

This invention was made with Government support under Grant No. DE-FC02-93ER54186 awarded by the Department of Energy (DOE). The Government has certain rights in the invention.

FIELD

Embodiments disclosed herein relate to detecting operational conditions of devices in liquid or gas using a distributed sensor system. Specifically, embodiments disclosed herein relate to a quench detection for superconductor magnets and cables made of a High Temperature Superconducting (HTS) tapes, such as 2G Rare Earth Elements-Barium-Copper-Oxide (REBCO) thin flat tapes and BSCCO.

BACKGROUND

Superconducting devices, such as superconducting magnets and superconducting power transmission cables, must be cooled below their critical operating temperature. In fact, only below this critical temperature are the electrical conductors of these devices superconductive. These devices are cooled with low temperature coolant fluid, which may be a gas or liquid, such as helium, hydrogen, neon, and nitrogen, and others.

When the superconducting material is cooled, the normal resistive state of the material becomes a superconductive state, and the electric resistivity of the material becomes very close to zero. However, during operation, the superconducting material can abruptly change its state from superconductive to normal. This event is referred to as "quench". When a quench occurs, it is important to quickly discard the external applied electric power and safely dissipate the electromagnetic energy of the superconducting devices (magnet and/or power cable) into a protection circuit. In order to do this, it is essential to detect the quench as quickly as possible, otherwise the superconducting conductor may be seriously degraded or potentially destroyed.

Recently, high temperature superconductors (HTS), such as Bismuth Strontium Calcium Copper Oxide (BSCCO) and Rare Earth Barium Copper Oxide (REBCO) conductors, have been developed and are commercially available. The devices made with those conductors are operated in a coolant, such as liquid nitrogen, liquid helium, liquid hydrogen or helium gas. HTS conductors have excellent mechanical properties with respect to axial and torsional strains, as well as high current density at high magnetic fields. The second generation (2G) REBCO HTS tapes will be very attractive for high field superconducting magnet applications, such as various industrial magnet devices for compact synchrocyclotrons, MRI, NMR, SMES, transformers, fault current limiters and generators, fusion and accelerator magnets including dipoles, quadrupoles, and corrector magnets.

However, detecting a quench in these new high temperature superconductors, especially REBCO conductors, is very difficult. This is because the normal zone propagation velocities are very slow compared with other type of superconductors known as low-temperature-superconductor (LTS), such as NbTi and $Nb_3Sn$. Furthermore, the quench zone is confined to a very small area. For those reasons, it is difficult to detect a quench of HTS devices using conventional electric voltage methods. To detect quickly a quench for an HTS device, it is essential to implement a very sensitive quench detection method that can quickly detect the quench.

Various quench detection methods have been developed:
(1) Voltage detection of a normal zone,
(2) Hydraulic coolant pressure detection,
(3) Detection of acoustic emission (AE) due to cracking, delamination and rapid temperature changes of a quench, and
(4) temperature detection by optical fibers.

To date, the voltage detection method using voltage taps has been most commonly used. The voltage taps must be mounted, such as by soldering, on a superconducting conductor and the electric wires are co-wound along the superconducting conductor in order to cancel undesired induced inductive voltages. The electric wires used for voltage taps complicate the fabrication of a magnet and its operation due to high induced voltage. Therefore, it is not desirable to install many voltage tap wires on a magnet. Other quench detections are still under development, and their usage is very limited at present.

Therefore, it would be beneficial if there were a system and method that could readily identify quench conditions without the drawbacks of the current technologies.

SUMMARY

The present system and method allow for the detection and diagnosis of abrupt changes of a device operating condition using a sensor array disposed in the coolant where the device is located. The purpose of the sensor array is to identify, in real time, abrupt changes quickly and detect the location of the incident. It may be used, for example, for quench detection of superconducting cables and magnets. This system and method are not only limited to use with superconducting conductors such as magnets, power transmission cables, SMES, MRI, motors and generators, but could also be used for any electric devices disposed in liquid or gas. It can also be used for a liquid level meter. Further, this system and method are not limited to low temperature devices, but may also be used in room temperature or elevated higher temperature devices disposed in gas and/or liquid.

Characteristics of this sensor system and method include passive detection, a very simple electrical detection method, identification of the location where the event occurs, economical, and ease of use. This system and method are also advantageous because they do not require external excitation, such as laser-light and microwave, except for electric power, and there is no need to mount voltage taps on the conductor.

By identifying the location of an actuated sensor in the sensor array, the location of the abnormal event in a superconducting conductor can be identified by the sensor array. The system and method can be used to find the location of a quench of a superconducting magnet and/or a superconducting power cable through use of the sensor array system. Further, the system and method can be used to identify the location of an abnormal event in an element disposed in a fluid.

According to one embodiment, a system for detecting events in a superconducting system is disclosed. The system comprises an enclosure; a coolant fluid disposed in the enclosure; a superconducting element disposed within the enclosure; and a sensor array disposed in the enclosure, wherein the sensor array detects an event in the superconducting element based on detecting pressure waves generated due to a temperature change by the event and transmitted in the coolant fluid. In certain embodiments, the coolant fluid is disposed in a coolant channel disposed in the superconducting element and the sensor array is disposed in the coolant channel. In some embodiments, the coolant fluid comprises a liquid. In some embodiments, the coolant fluid comprises a gas. In certain embodiments, the superconducting element comprises a superconducting conductor. In some embodiments, the superconducting element comprises a superconducting magnet. In some embodiments, the superconducting element comprises a bundled cable with a center coolant channel, wherein the sensor array is disposed in the center coolant channel. In certain embodiments, the superconducting element comprises a multiple cabled conductor of sub-cables with a center coolant channel, wherein the sensor array is disposed in the center coolant channel. In some embodiments, the superconducting element comprises a rectangular conductor with coolant channels disposed on the side of the superconducting element, and wherein the sensor array is disposed at least in one of the coolant channels. In certain embodiments, the sensor array comprises one or more pressure sensors; wherein the pressure sensors are selected from the group consisting of acoustic sensors, MEMS switches, continuous pressure sensors, force sensitive resistors, and soft potentiometers. In some embodiments, the sensor array is disposed within a flexible, non-porous outer tube, such that the pressure waves deflect the outer tube to allow the pressure wave to be detected by the sensor array. In certain embodiments, an interior of the outer tube is pressurized at a same pressure as the pressure of the coolant fluid.

According to another embodiment, a system for determining a location of a thermal event in a superconducting system is disclosed. The system comprises an enclosure; a coolant fluid disposed in the enclosure; a superconducting element disposed within the coolant fluid; and a sensor array disposed in the coolant fluid, the sensor array comprising a plurality of pressure sensors, wherein one or more of the plurality of pressure sensors in the sensor array detects the thermal event in the superconducting element based on detecting pressure waves generated due to a temperature change by the thermal event and transmitted in the coolant fluid, and a location of the thermal event is determined based on which one of the plurality of pressure sensors first detects the pressure waves. In certain embodiments, the sensor array comprises a linear array of equally spaced pressure sensors. In some embodiments, the system comprises a controller, wherein outputs of the sensor array are in communication with the controller. In some embodiments, each of the plurality of pressure sensors has an optical fiber cable in communication with the controller. In certain embodiments, the outputs of the plurality of pressure sensors are combined into a smaller number of wires, wherein a combination of wires are actuated if an event is detected and the combination of wires that is actuated is indicative of the pressure sensor that detected the event first. In certain embodiments, the sensor array comprises a plurality of sub-groups, wherein each sub-group supplies an indication that a pressure wave was detected by the sub-group. In certain embodiments, at least one of the sub-groups comprises a plurality of pressure sensors connected in parallel. In some embodiments, at least one of the sub-groups comprises a continuous pressure sensor. In certain embodiments, the outputs of the plurality of sub-groups are combined into a smaller number of wires, wherein a combination of wires are actuated if an event is detected and the combination of wires that is actuated is indicative of the sub-group that detected the event first.

BRIEF DESCRIPTION OF THE DRAWINGS

For a better understanding of the present disclosure, reference is made to the accompanying drawings, which are incorporated herein by reference and in which:

FIGS. 5A-5C show the sensor array in various configurations;

FIG. 7 shows a system for detecting thermal events using a sensor array;

FIGS. 10A-10E show different embodiments of the sensor array;

FIG. 11 shows an embodiment where the sensor array includes sub-groups;

FIGS. 12A-12C show sub-groups according to three embodiments;

FIGS. 14A-14B show discrete pressure sensors within an outer tube;

DETAILED DESCRIPTION

Figure 1A:
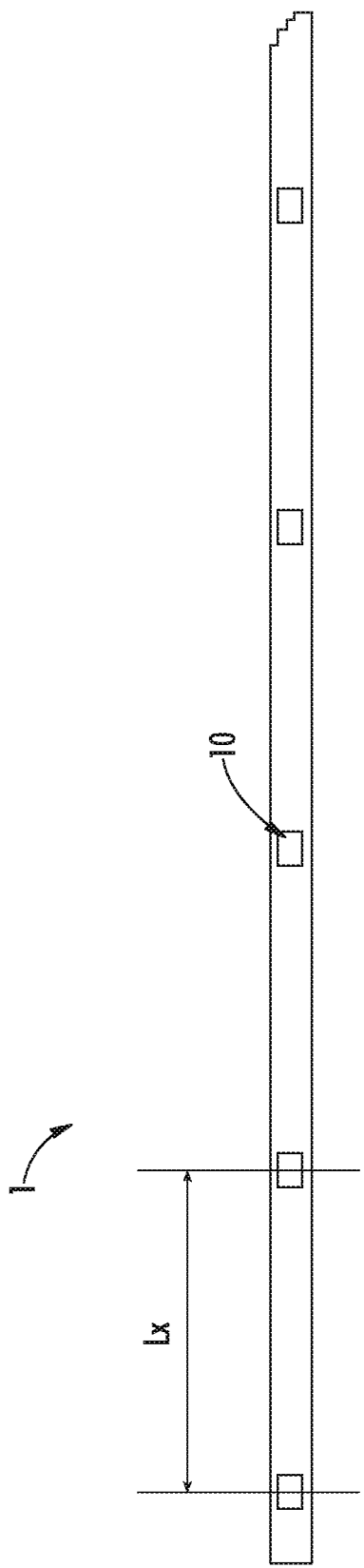
FIG. 1A show a sensor array for use with the present system according to one embodiment and FIG. 1B shows the electrical connections for a pressure sensor according to one embodiment.

A novel alternative to the most common method of detecting quench (i.e. voltage taps) is disclosed herein. In one embodiment, a system and method are used to detect a quench and magnet or cable temperature changes using sensors disposed in a coolant channel along a superconducting conductor. The sensors are small enough to be installed in a cooling channel, and are arranged to form an array along the cooling channel. Using a minimal number of electric wires, the sensor array detects a pressure wave. This signal may be in communication with externally connected electronic devices, such as amplifiers, and allows to determine a quench location.

The condition of the coolant of a superconducting conductor or magnet is monitored continuously using pressure sensors, such as acoustic sensors, MEMS sensors, continuous pressure sensors, force sensitive resistors, or flexible soft potentiometers. A pressure sensor can very quickly detect a change in condition, such as a temperature rise of a superconducting conductor or magnet in fluid. In addition, in general, pressure sensors can diagnose cooling condition of coolant of gas or liquid, which is affected by the temperature of a superconducting conductor or magnet.

As noted above, the pressure sensors may be arranged as an array. Therefore, to determine the location of a quench, the pressure sensor that generates the signal is identified. The pressure sensors each generate an output due to pressure waves caused by changes in temperature and/or mechanical hydraulic conditions of the coolant in which the superconductor and sensors are immersed. When a quench occurs, the superconductor material generates heat that vaporizes the liquid coolant or causes thermal expansion of the coolant. Those events cause pressure waves to be generated, which travel through the coolant and are detected by one or more sensors. Even smaller heat disturbances before quenching, such as nuclear heating condition of the coolant, may create small bubbles at the heating surface, such as the magnet surface, and generate pressure waves. The pressure wave signals are detected by sensors and indicate an abnormal condition of the device.

The present system is different from existing conventional Acoustic Emission (AE) type quench detection techniques. Conventional AE methods detect a quench by mechanical movement (cracking or conductor motion) of a superconducting magnet and do not monitor or record the coolant behavior. Conventional AE sensors are mounted on a magnet surface, and the sensors detect acoustic waves due to mechanical movement such as cracking of epoxy on a superconducting conductor caused by thermal stress when a magnet is cooled and quenches, or by stress due to an electromagnetic force when a magnet is charged. In other words, traditional systems rely on a mechanical change to the conductor, magnet or the attached epoxy. In contrast, the present system and method detects pressure waves generated by temperature changes transmitted through the coolant.

A sensor array allows identification of the location of temperature changes in a superconducting conductor. The sensors may be distributed in a coolant channel or on a solid body of a magnet and a conductor, making very quick detection possible. Furthermore, the sensor array can easily be electrically isolated from a superconducting conductor, avoiding problematic issues observed with other techniques (such as grounding and shorts with voltage taps). The sensor array is easily installed in a cooling channel. Even after fabrication, the sensor array can be inserted from one end of a superconducting conductor.

FIG. 1A shows conceptually a sensor array 1 to detect an abnormality, such as a temperature rise of any device in a coolant, such as a quench of a superconducting magnet. The pressure waves propagated in the coolant are received by the pressure sensors 10 of the sensor array 1. This sensor array 1 may be a linear array, where each of the pressure sensors 10 is separated from the adjacent sensor by a distance Lx. Of course, in other embodiments, the sensor array 1 may be a two-dimensional array.

Figure 1B:
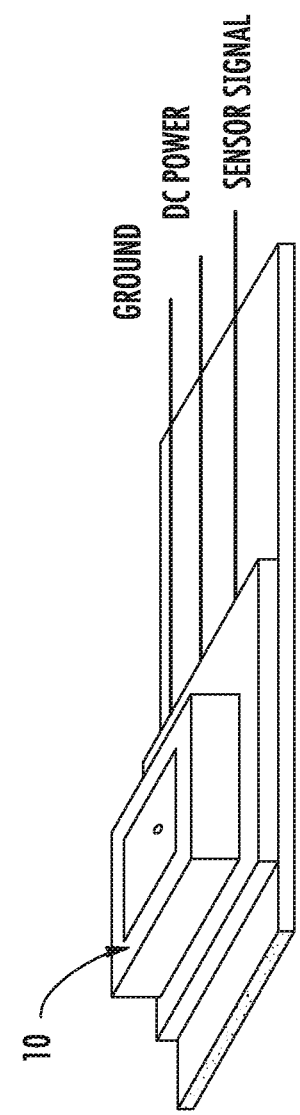

In certain embodiments, each pressure sensor 10 has three wires associated with it, as shown in FIG. 1B. These three wires may be the power, ground and output signals. In other embodiments described in more detail below, there may only be two wires associated with the pressure sensor; a power wire and an output signal wire.

As noted above, various types of pressure sensors may be used. These include acoustic sensors, MEMS switches, continuous pressure sensors, pressure sensitive resistors, soft potentiometers and others.

In one embodiment, acoustic sensors are used. In this embodiment, the sensor array 1 may be composed of micro acoustic sensors, also referred to as microphones (shown in FIG. 2).

Figure 2:
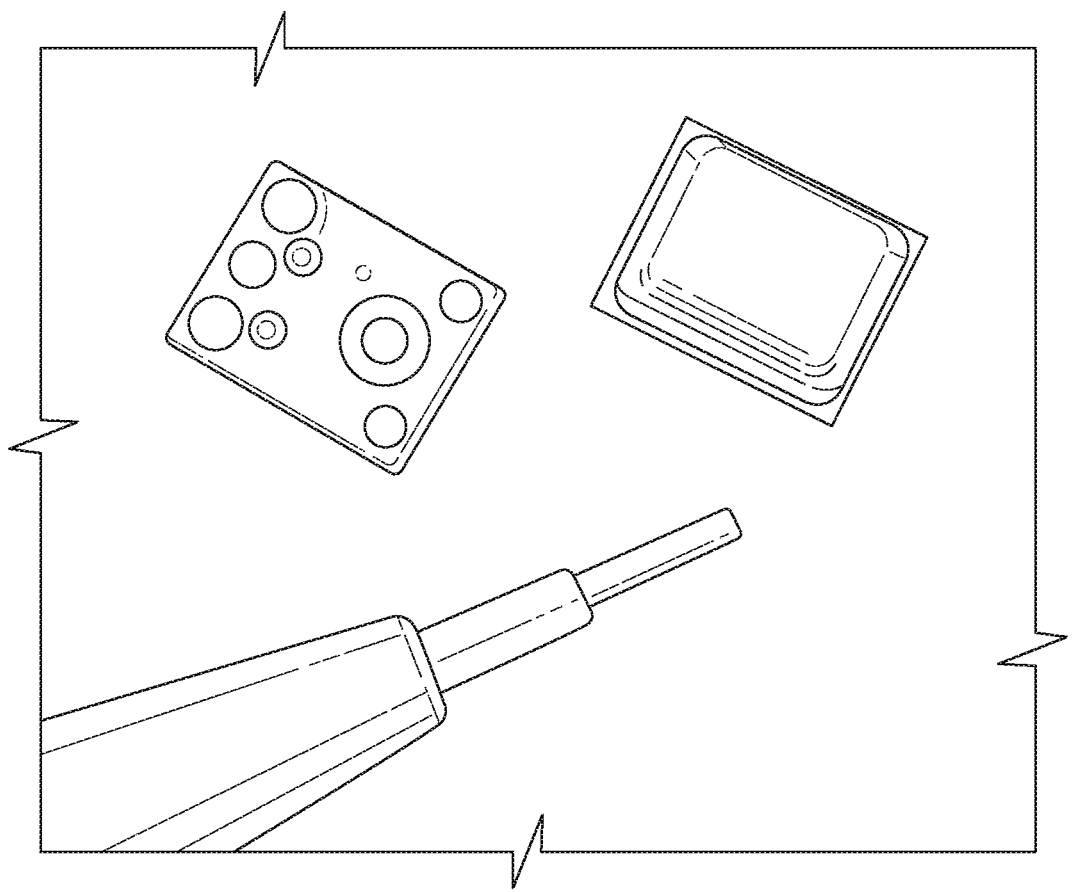
FIG. 2 is a representative example of an acoustic sensor shown with a mechanical pencil lead having a 0.5 mm diameter.

FIG. 2 shows an example of a commercially available capacitor-based acoustic sensor. The size of certain sensors may be about 4 mm×3 mm×1 mm. Of course, the acoustic sensors may be other dimensions. Other types of acoustic sensors, such as piezoelectric-type micro acoustic sensors, may also be used.

The acoustic sensors of the present disclosure are intended to be operated in liquid and/or gas environments. The acoustic sensors may need to be robust in vacuum, since they might be exposed in vacuum. Consequently, the acoustic sensors of the present disclosure may have different operational requirements from conventional commercial microphone type sensors. The sensor characteristics can be specific for each application to meet the required frequency responses.

Conventional acoustic sensors for voice microphone applications require a flat frequency response between about 100 Hz and 10 kHz. However, the frequency response for the present applications can be narrower. The frequency range of the acoustic sensor may be matched to the frequency range of the specific applications corresponding to an event to be detected.

Furthermore, pressure sensors may be used in a high magnetic field, in an environment with high pressure (gas or liquid) and low temperature for certain applications, such as CICC (cable-in-conduit conductor) superconducting magnet applications. Certain applications require the sensor to be in vacuum before adding the coolant in order to clean the inside of the conduit enclosure. For such applications, specially developed pressure sensors may be used.

As stated above and shown in FIG. 1A, in certain embodiments, the pressure sensors 10 on the sensor array 1 are separated from each other by a separation distance Lx. The separation between adjacent sensors 10 does not need to be equal, however the location of each of the sensors 10 may preferably be known, in order to accurately identify the quench location from the sensor location.

In general, the wave propagation speed in liquid coolant, such as helium and hydrogen, is about 1400 m/s. Therefore, if the separation of the pressure sensors 10 in the sensor array 1 is Lx=10 m, the pressure wave signal of a superconductor will be detected in less than 3.6 ms. This is determined by half the separation, divided by the speed of propagation, or 5 m/1400 m/s. If the separation of the sensors 10 is Lx=2 m, the acoustic pressure signal can be detected in about 0.8 ms in liquid coolant. The detection delay time due to the sensor location can be reduced by reducing the sensor separation distance Lx.

Figure 8A:
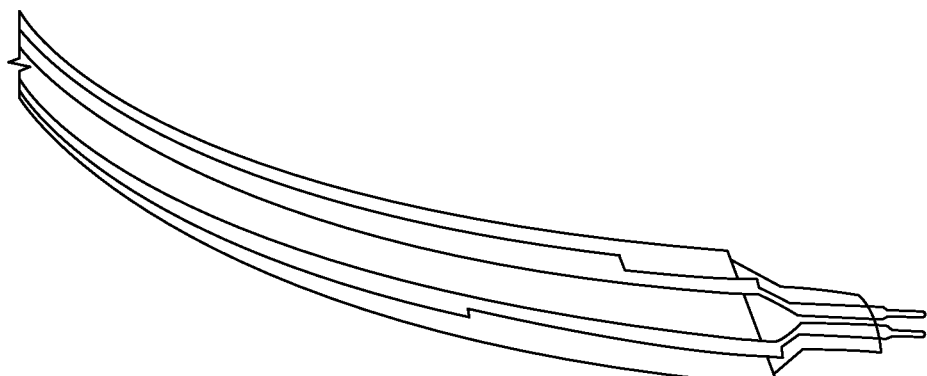
FIG. 8A-8D show various embodiments of a continuous pressure sensor.
Figure 8B:
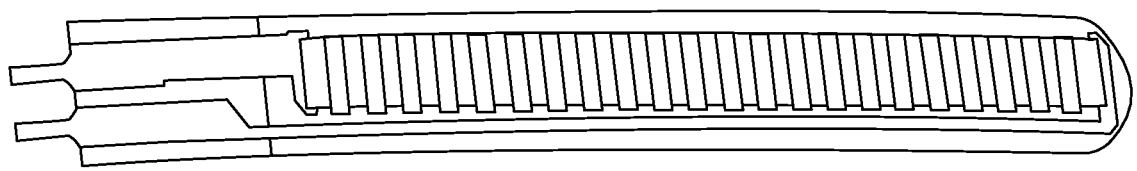
Figure 8C:
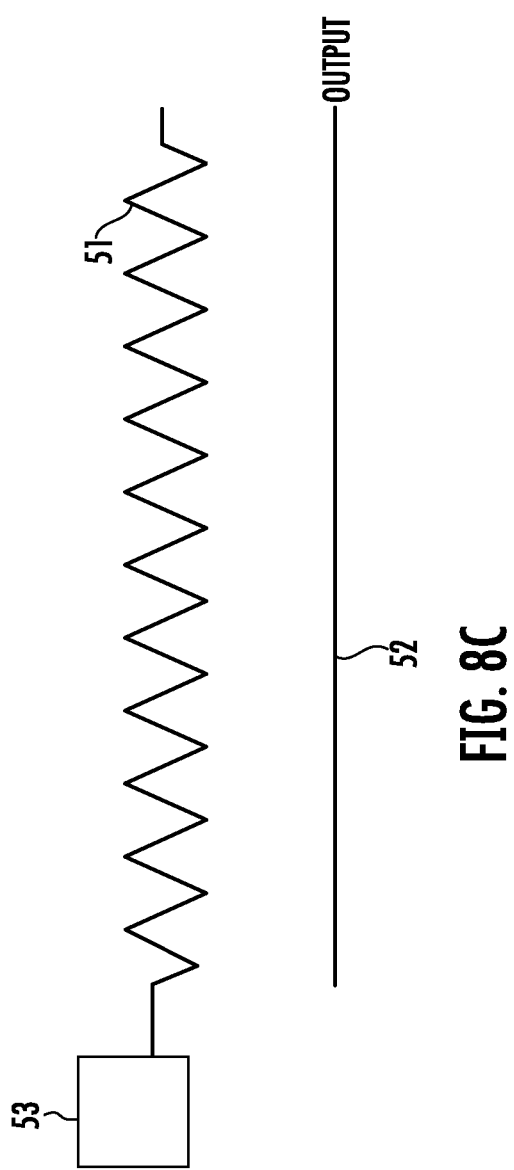
Figure 8D:
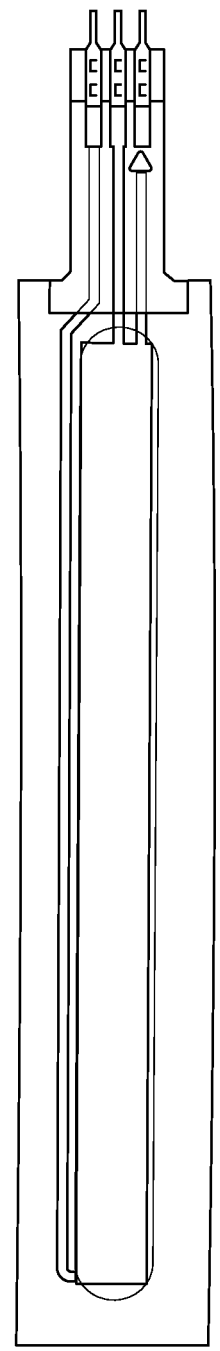

FIGS. 3A-3D and 4A-4C describe embodiments in which the pressure sensor 10 has 3 wires, as is the case with acoustic sensors and certain types of continuous pressure sensors, such as that shown in FIG. 8D. Embodiments which include a pressure sensor 10 having two wires are described below.

Figure 3A:
FIGS. 3A-3D show various embodiments of a sensor array.

In certain embodiments, the pressure sensors 10, which may be acoustic sensors, continuous pressure sensors and/or MEMS sensors, in a sensor array 1 may be electrically connected as shown in FIG. 3A. The power and ground supply lines of the pressure sensors 10 may be connected in parallel, but the signal output of each pressure sensor 10 may be connected independently to identify the sensor which generates an output signal.

Figure 3B:
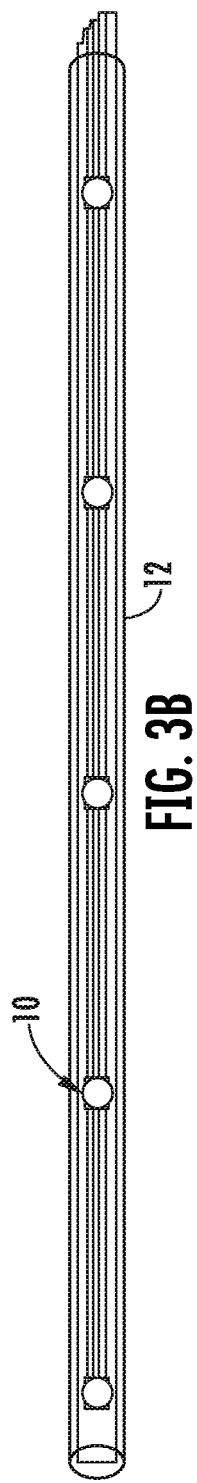
Figure 3C:
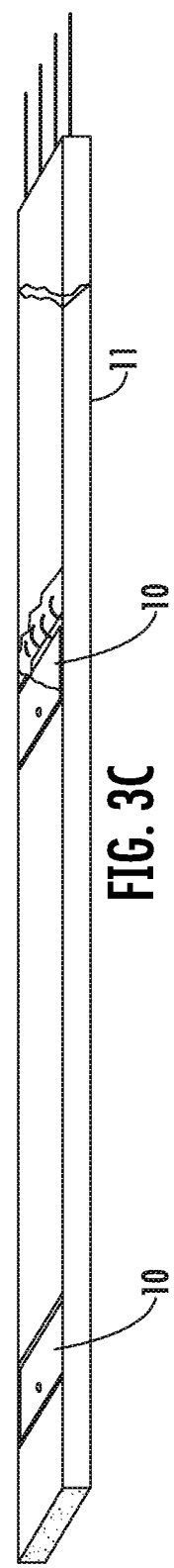

These pressure sensors 10 may be mounted in a straight line on a narrow long flexible plate 11, as shown in FIG. 3A. FIG. 3C shows an enlarged illustration of the embodiment of FIG. 3A. Only two pressure sensors 10 are shown and the rightmost pressure sensor 10 is partially exposed to show the details of the pressure sensor 10. Alternatively, the pressure sensors 10 may be mounted in a straight line in a long flexible porous tube 12, as shown in FIG. 3B. The porous tube 12 may be non-metal or metal. The pressure sensors 10 may be mounted to minimize hydraulic resistance to reduce noises due to hydraulic flow turbulence. The sensor arrays 1 can be inserted from either end of a power cable and a magnet conductor before or after magnet winding, as shown in FIG. 3D.

Figure 3D:
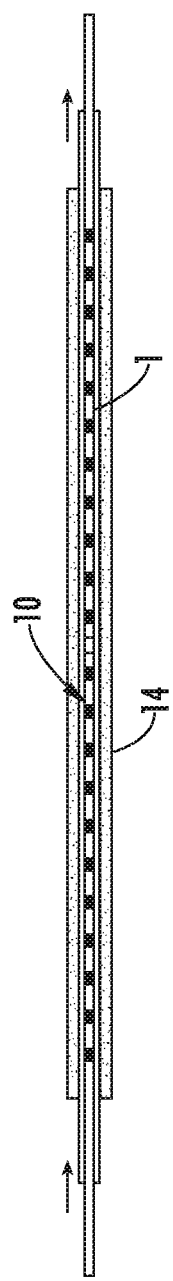

As shown in FIG. 3D, the sensor arrays 1 can be inserted from either end of a power cable 14 and/or a magnet conductor before or after magnet winding. The arrows in FIG. 3D indicate the direction of coolant flow.

Figure 4A:
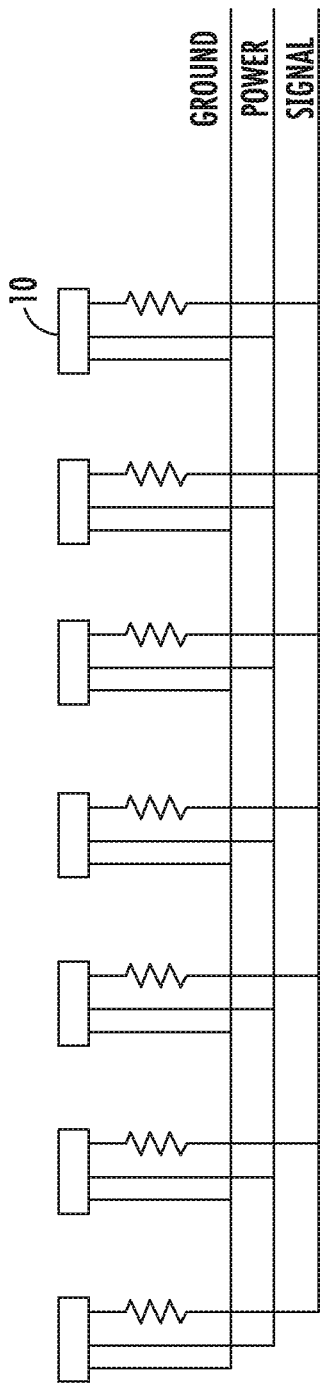
FIGS. 4A-4C show the electrical wiring of the sensor array using three-wire sensors according to three embodiments.

In certain embodiments, it may not be necessary to determine which pressure sensor 10 outputs the signal. In such embodiments, the pressure sensors 10 will not need to be independently wired. In other words, the sensor signal outputs of all of the pressure sensors 10 can be connected in parallel as shown in FIG. 4A. In this embodiment, a single signal is created by the sensor array 1. This allows the system to be extremely flexible and easy to configure for any operational condition. This embodiment is beneficial when the detection of a quench or other abnormal event, but not its location, is desired.

Figure 4B:
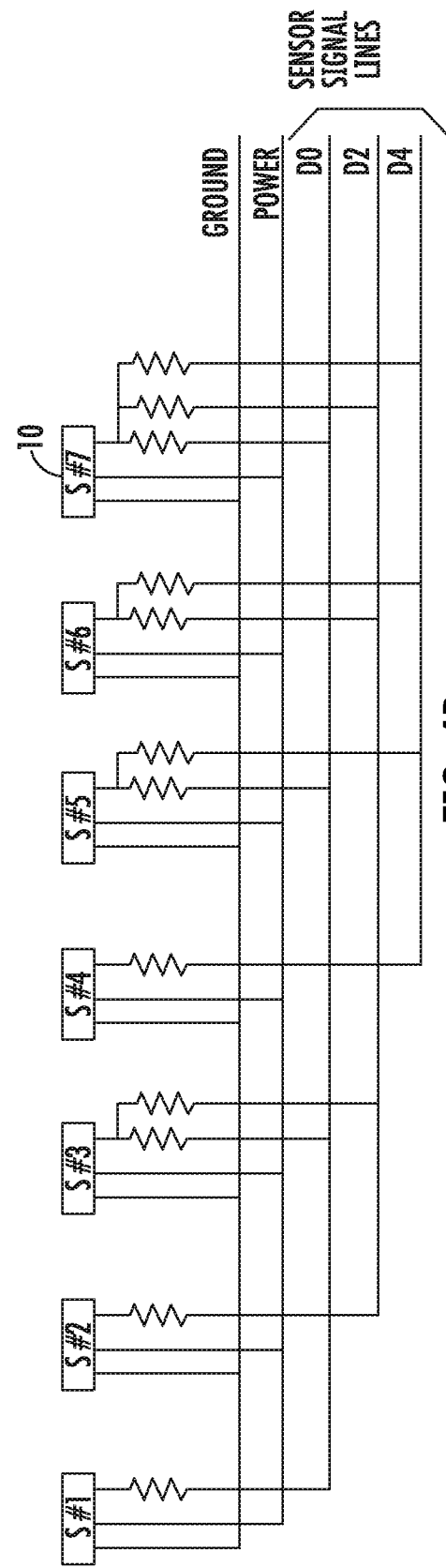

In certain embodiments, the number of wires can be reduced with a proper configuration. FIG. 4B illustrates, as an example, a five-wire method to connect seven pressure sensors 10 (numbered S #1-S #7). The seven pressure sensors 10 may be mounted on a flexible plate (sensor plate) with two lines for ground and power wires and three sensor signal output wires, as shown in FIG. 4B. Each sensor 10 is powered with two lines: a ground wire and a power wire. The signal lines of D0, D2 and D4 are constructed with three wires in this case. The sensor wiring method in FIG. 4B can be logically followed with a binary code. Using n wires, $2^n-1$ sensors can be connected (n=5 for 31 sensors), and the pressure sensor can be identified by detecting which signal line numbers of the output signal are actuated. In FIG. 4B, the seven sensors 10 are connected to between one and three of the three wires: Sensor S #1 (labelled S #1) to D0, S #2 to D2, S #3 to D0 and D2, S #4 to D4, S #5 to D0 and D4, S #6 to D2 and D4, S #7 to D0, D2 and D4. When the output signals are actuated on D0 and D4 lines, the active sensor 10 generating the signal is known to be Sensor #5. The signal wires are connected to the sensors 10 through isolation resistors to prevent interference between the signal lines. It is noted that while seven sensors 10 with three signal wires are shown, this coding scheme may be used with any number of sensors 10 and signal wires. Further, while this describes a binary coding system, the output signals from the sensors 10 may be configured in another manner if desired.

Figure 4C:
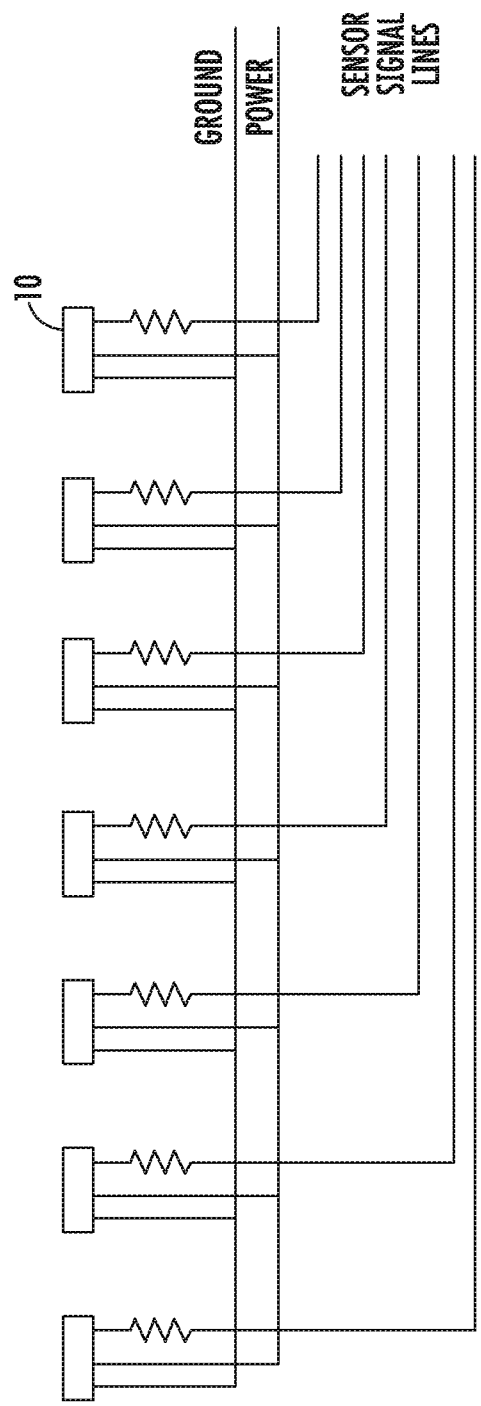

In another embodiment, the output of each sensor 10 is separate from each other output, as shown in FIG. 4C. In other words, if there are N sensors 10, there are N output signals.

In another method to reduce the number of electric wires, well-known fiber-optic communication methods can be used. Electric signals of pressure sensors are converted into optical signals by the use of electro-optical transducers, and the optical signals are transmitted through the optical fibers. The optical signals received are converted into electric signals. Multiple sensor signals can be read using an optical technology with optical fibers.

To improve the detection signal quality of a pressure wave using a pressure sensor 10, such as an acoustic sensor, electronic filtering and frequency characteristic adjustment of the pressure sensor 10 can be used. In one embodiment, narrow band-pass filtering of the electronic signal may be used to enhance the detection sensitivity in order to detect only desired signals. In another embodiment, the analog signal can be digitized at the sensor site to improve the system Signal-to-Noise Ratio (SNR). Digital sensors can be used instead of the analog type of sensors for this purpose. In another embodiment, the signal quality can be also improved by employing software to reduce noise. In certain embodiments, signal improvement, such as background noise cancellation and acoustic echo signal reduction, can be performed by using signal conditioning and Doppler effect technologies, in order to detect effectively an abnormal location, such as a quench, of a superconducting conductor.

In a second embodiment, the sensor array 1 may be composed of MEMS (Micro-Electro-Mechanical System) sensors.

MEMS sensors are small enough to be installed in a cooling channel, and they may be arranged to form an array along the cooling channel. The sensors are wired and may be externally connected to electrical devices, such as a resistance meter and a voltmeter, to detect the sensor output signal. A sensor array allows identifying the location of temperature changes in a superconducting cable with the minimum number of electric wires. The sensors are widely distributed in the coolant channel so that it is possible to sensitively detect the location of a quench even if small.

Figure 9A:
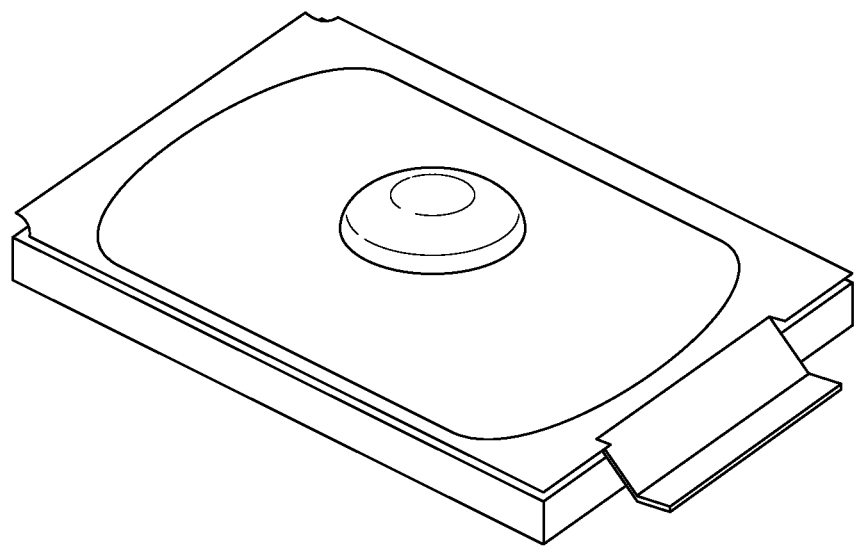
FIGS. 9A-9B are a representative example of a MEMS device and the schematic equivalent circuit, respectively.
Figure 9B:
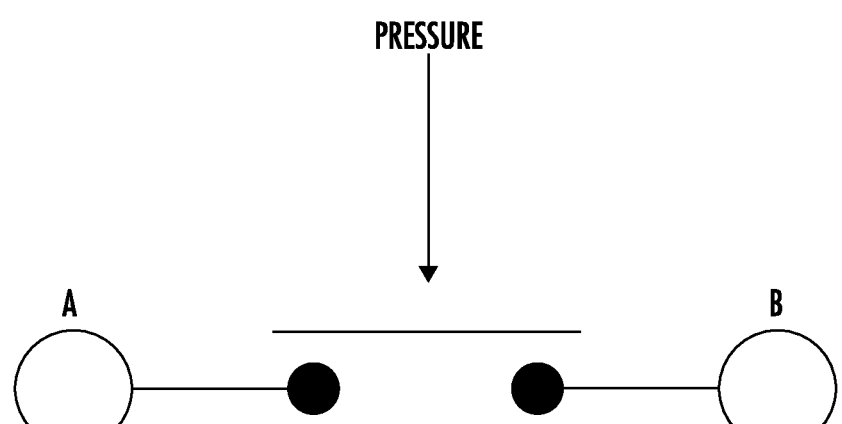

An example of this mechanical switch is shown in FIG. 9A. This is a very small MEMS mechanical switch (3 mm W×2 mm D×0.6 mm H), which is commercially available, such as a TACT IP68 from ALPS. The switch operates as a mechanical on/off switch, as illustrated in FIG. 9B. These MEMS switches only have two wires.

These two types of pressure sensors 10 (MEMS and acoustic) may be referred to discrete sensors.

Additionally, there are continuous pressure sensors. FIGS. 8A-C show commercially available force-sensitive resistors. Two tape-type sensor examples are shown FIGS. 8A and 8B. These sensors change the terminal resistances by applying mechanical force to the tape surface, such as a transverse force (pressure), as shown in FIG. 8A and a bending force, as shown in FIG. 8B. These sensors are commercially available from companies such as Interlink Electronics and SpectraSymbol. These sensors may not be made particularly for cryogenic use in a magnetic field such as a quench detection, but these are a line sensor and a continuous sensor instead of a discrete sensor. These two sensors are capable of detecting the exertion of pressure, but cannot identify the location of the pressure.

FIG. 8C shows another type of continuous pressure sensor. In this embodiment, the sensor comprises two separate conductors, 51, 52. Conductor 51 is a resistive material, while conductor 52 may be a conductive metal. One end of conductor 51 may be in communication with a voltage source 53. When pressed together, conductor 51 contacts with conductor 52. Further, the resistance between the voltage source and conductor 52 is related to the point at which the two conductors 51, 52 contact one another. Assume, as an example, that conductor 51 has a resistance of 100 ohms per inch, while the resistance of conductor 52 is minimal. If pressure is applied three inches from the first end of conductor 51, there will be 300 ohms of resistance between conductor 52 and the voltage source 53. Each of the continuous pressure sensors shown in FIGS. 8A-8C have two wires.

FIG. 8D shows another continuous pressure sensor. This sensor has three wires; a power, a ground and an output signal. The output signal is a value between the power signal and the ground signal, based on where the force is being applied. Thus, this sensor has two conductors, and a separate output signal. Like the sensor described in FIG. 8C, the two conductors contact each other. However, in this embodiment, the voltage is presented on a separate output signal. This embodiment may be referred to as a linear soft potentiometer (or soft pot) and is commercially available from SpectraSymbol, for example.

Figure 15A:
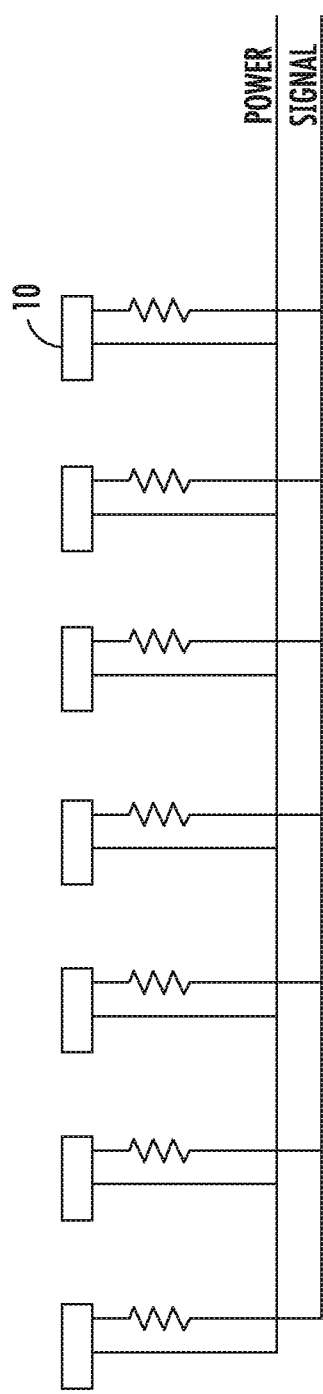
FIGS. 15A-15C show the electrical wiring of the sensor array using two-wire sensors according to three embodiments.

As described above, some of these sensors may have two wires; a power line and an output signal. In one embodiment, the sensor array is configured to detect a quench condition, but is not concerned with the location of the quench. In this embodiment, the pressure sensors 10 may be configured in parallel. In this way, if any of the switches are actuated, the voltage on the power signal will be transferred to the output signal. This configuration is shown in FIG. 15A. In certain embodiments, the signal wire may be in communication with a resistor connected to ground, where the resistor value may be very large. In this way, the signal is normally low, but is asserted when any of the switches are actuated.

Figure 15B:
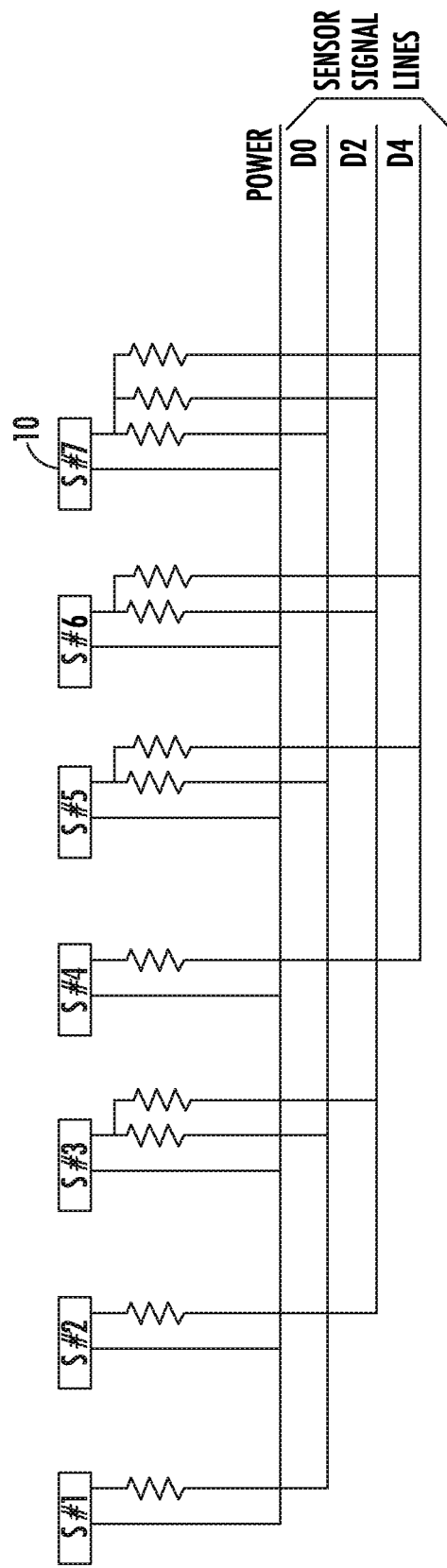

However, in other embodiments, it may be beneficial to detect a location of the quench. This may be performed in several ways. In one embodiment, the number of wires can be reduced with a proper configuration. FIG. 15B illustrates, as an example, a four-wire method to connect seven pressure sensors 10 (numbered S #1-S #7). The seven pressure sensors 10 may be mounted on a flexible plate (sensor plate) with one signal for power and three sensor signal output wires, as shown in FIG. 15B. Each sensor 10 receives a power wire. The signal lines of D0, D2 and D4 are constructed with three wires in this case. The sensor wiring method in FIG. 15B can be logically followed with a binary code. Using n wires, $2^n-1$ sensors can be connected (n=5 for 31 sensors), and the pressure sensor can be identified by detecting which signal line numbers of the output signal are actuated. In FIG. 15B, the seven sensors 10 are connected to between one and three of the three wires: Sensor S #1 (labelled S #1) to D0, S #2 to D2, S #3 to D0 and D2, S #4 to D4, S #5 to D0 and D4, S #6 to D2 and D4, S #7 to D0, D2 and D4. When the output signals are actuated on D0 and D4 lines, the active sensor 10 generating the signal is known to be Sensor #5. The signal wires are connected to the sensors 10 through isolation resistors to prevent interference between the signal lines. Additionally, as described above, pulldown resistors may be disposed on each of the output signals. It is noted that while seven sensors 10 with three signal wires are shown, this coding scheme may be used with any number of sensors 10 and signal wires. Further, while this describes a binary coding system, the output signals from the sensors 10 may be configured in another manner if desired.

Figure 15C:
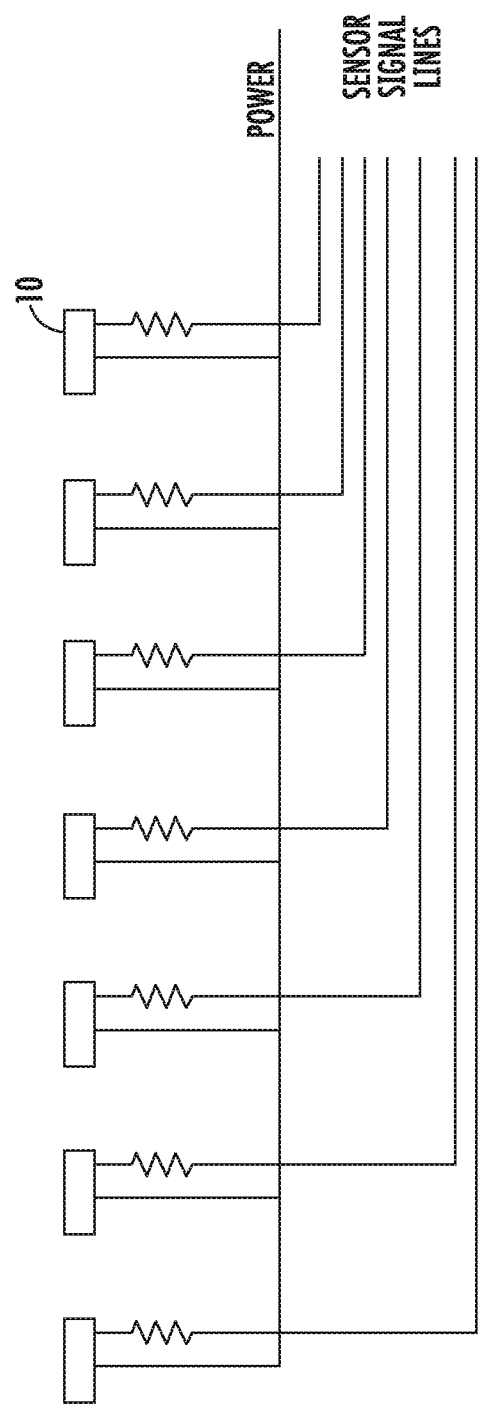

In another embodiment, the output of each sensor 10 is separate from each other output, as shown in FIG. 15C. In other words, if there are N sensors 10, there are N output signals.

These different pressure sensors may be used as part of a linear sensor array.

In one embodiment, shown in FIG. 10A, which is similar to that shown in FIG. 3A, a linear array of discrete pressure sensors 10, such an acoustic sensors or MEMS sensors, may be employed. This figure differs from FIG. 3A in that the discrete pressure sensors in FIG. 10A have two wire interfaces. The pressure sensors 10 are arranged predetermined separation distances, which do not need to be at a constant separation. The wires for instrumentation may be connected to the outside of a superconducting device.

FIG. 10B shows a continuous sensing element that can detect pressure at a point or a certain length of the surface. This continuous sensing element may be any of the continuous pressure sensors shown in FIGS. 8A-8D. Again, the wires for instrumentation may be connected to the outside of a superconducting device. The continuous sensing element may have a two-wire or a three-wire interface.

The sensor signal and power wires shown in FIGS. 10A-10B may be twisted together to reduce an undesired induced voltage due to a time-varying magnetic field, as shown in FIG. 10E. An alternate method to reduce the magnetic flux induced voltage can be an optical method using an optical fiber system to transmit the sensor signals to the outside of the magnet device as described earlier.

FIG. 10C shows the sensor array 1 disposed in an outer tube 100. The sensor array 1 may be constructed using any of the pressure sensors described above. The outer tube 100 is non-porous and isolates the environment within the outer tube 100 from the environment outside the outer tube 100. The outer tube 100 may have a cross-section that may be circular, rectangular or any other shape. The outer tube 100 is used to protect the pressure sensors 10 from the coolant environment, which may be gas and/or liquid, vacuum or very high pressure. Further, the outer tube 100 is flexible such that the pressure sensors 10, disposed inside the outer tube 100 may effectively detect the pressure wave. As shown in FIG. 10D, the outer tube 100 can be flexibly deformed by a pressure wave 101 caused by a quench to transfer the pressure wave 101 to the pressure sensors 10 disposed within the outer tube 100. In certain embodiments, the entirety of the outer tube 100 is flexible, made of plastic, metal and other flexibly deformable material. In other embodiments, only one surface of the outer tube 100 may be flexible.

The interior of the outer tube 100 may also be pressurized such that the pressure within the outer tube 100 is equal to the pressure outside the outer tube 100.

In some embodiments, the interior of the outer tube 100 can be evacuated to vacuum, so as to balance the pressure on both sides of the outer tube 100 when the superconducting device, such as a CICC, is pumped out. In other embodiments, the interior of the outer tube 100 can be filled with a gas such as helium, hydrogen, or nitrogen to increase the pressure within the tube, when it is required.

In other words, an external pressure can be applied to the interior of the outer tube 100 during normal operation of a superconducting device. The external pressure can be adjusted to a required pressure to balance the superconducting coolant pressure, as shown in FIG. 10D. For example, a superconducting device, such as a CICC, may be operated with a pressurized coolant (for example, at ~5 atm pressure). In this case, the outer tube 100 is filled with helium or other suitable gas of similar pressure as that of the coolant pressure. In this way, the outer tube 100 can easily deform in response to pressure due to a quench.

As shown in FIG. 10D, the outer tube 100 can flexibly deform to propagate the pressure of the coolant to the sensor. When the coolant propagates the pressure wave 101 due to a quench, the outer tube 100 can be deflected inward. When the pressure releases, the tube deflection may naturally disappear. To make the removal of the deflection easier, an external pressure can be applied to the interior of the outer tube 100, if required. In this way, the outer tube 100 provides easy operation for quench detection by controlling the pressure (vacuum to high pressure) by an external gas when it is required.

Figure 13A:
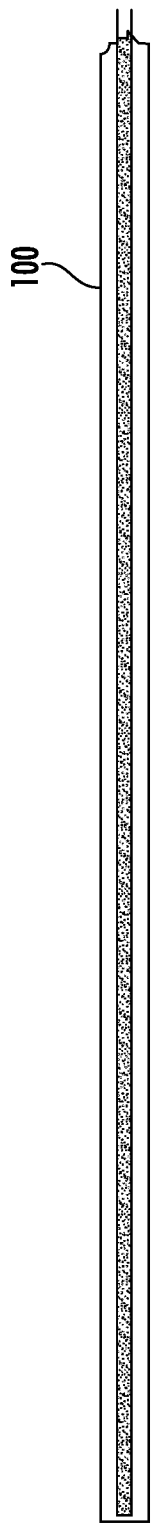
FIGS. 13A-13C show a continuous pressure sensor within an outer tube.
Figure 13B:
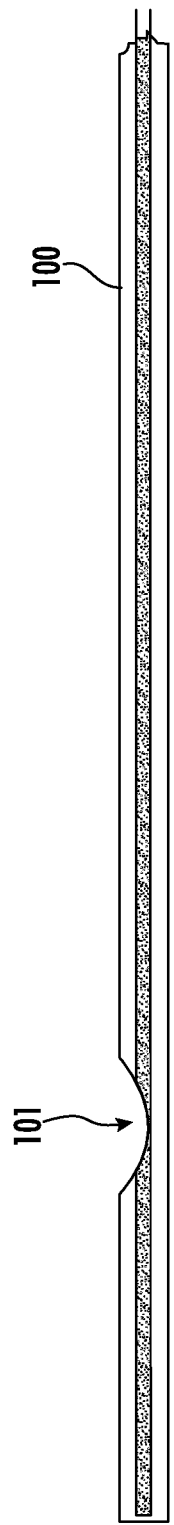
Figure 13C:
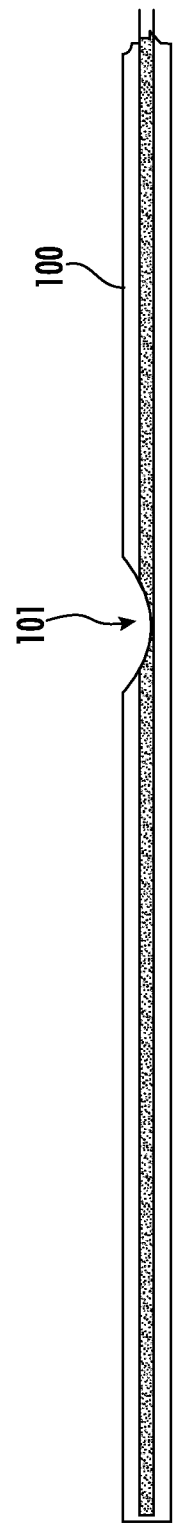

Within the outer tube 100, the array 1 may be made up of discrete pressure sensors, such as MEMS switches or acoustic sensors, or continuous pressure sensors. For example. FIG. 13A shows a continuous pressure sensor disposed within an outer tube 100. When a pressure wave 101 impacts the outer tube 100, as shown in FIG. 13B, the outer tube 100 deflects such that contact may be made between the two conductors of the continuous pressure sensor. The result of this contact may be presented on the second conductor (in the case of the sensor in FIG. 8C) or on the output signal (in the case of the sensor in FIG. 8D). FIG. 13C shows the outer tube being deflected at a different location by pressure wave 101. In this case, the electric signal (voltage) presented by the continuous pressure sensor will differ from that shown above.

The outer tube 100 may also be used with discrete pressure sensors. FIG. 14A shows a sensor array using discrete sensors such as mechanical switches, for example, a plurality of MEMS switches, such as those shown in FIG. 9A. In the figure, the sensors 10 are mounted on a thin plate to make a linear array. In a quench detection application, as the mechanical switch is used, the sensors should be protected from various issues such as contamination problems of the electric contact points for a long term use in vacuum and gas, and liquid coolants, and also high pressure, as described earlier. Therefore, the switch array can be encapsulated with an outer tube 100, as illustrated in FIG. 14B. The outer tube 100 protects the pressure sensors 10 from vacuum pressure and high pressure, and also the pressurized operation of the inner gas recovers the deflections as described earlier.

It was noted above that the sensors may be separated by a separation distance, Lx. This distance may be determined based on the required time to detect a pressure wave. However, in certain embodiments, it may be advantageous to group sensors closer than the separation distance Lx. For example, the deflection of the outer tube 100 may be limited to an area that is much smaller than Lx.

In this situation, it may be advantageous to create sub-groups, also referred to as pressure identification zones. A sub-group, or pressure identification zone, comprises one or more pressure sensors that occupy a linear portion of the sensor array. However, the sub-group, or pressure identification zone, is limited in that detection of the particular location within the sub-group where the pressure wave impacted the zone cannot be determined.

FIG. 11 shows a sensor array 1 with a sub-group 30. Each sub-group 30 may by separated from the adjacent sub-group 30 by a separation distance of Lx. A sub-group 30 may have one or more pressure sensors. If the sub-group 30 includes discrete sensors, the sensors in the sub-group 30 may be separated by a separation distance of La, which is smaller than Lx. In certain embodiments, if there are N discrete sensors in a sub-group 30, La may equal Lx/N. Of course, in certain embodiments, the separation distances La and Lx may not be constant values.

To reduce wiring and electrical connections, the discrete sensors within a sub-group 30 may be configured to have a single output, such as is shown in FIGS. 4A and 15A. Different sub-groups 30 may be configured to allow detection of the particular sub-group that detected the pressure wave. This may be done using the configurations shown in FIGS. 4B-4C and 15B-15C, for example.

Alternatively, each sub-group 30 may comprise a single continuous pressure sensor, such as that of FIG. 8A, which detects force but cannot detect location. This is shown in FIG. 12B.

A plurality of these sub-groups 30 may be used to create a sensor array 10. For example, the sub-group 30 may be fabricated as a unit element. In some embodiments, a signal conditioner, such as an amplifier 31, can be installed for the sensors in the sub-group 30, as shown in FIG. 12A. Further, each end of the sub-group 30 may include a connector 32, for connection to an adjacent subgroup.

Further, a series connection of these sub-groups 30 may be used to create a long length of sensor array 10, as shown in FIG. 12C. Each sub-group 30 may have connectors 32 on the both ends to allow a series connection with another sub-group 30. In certain embodiments, after connected, the sub-groups 30 may be configured as shown in FIGS. 4B-4C or 15B-15C to enable detection of the quench location.

Figure 16A:
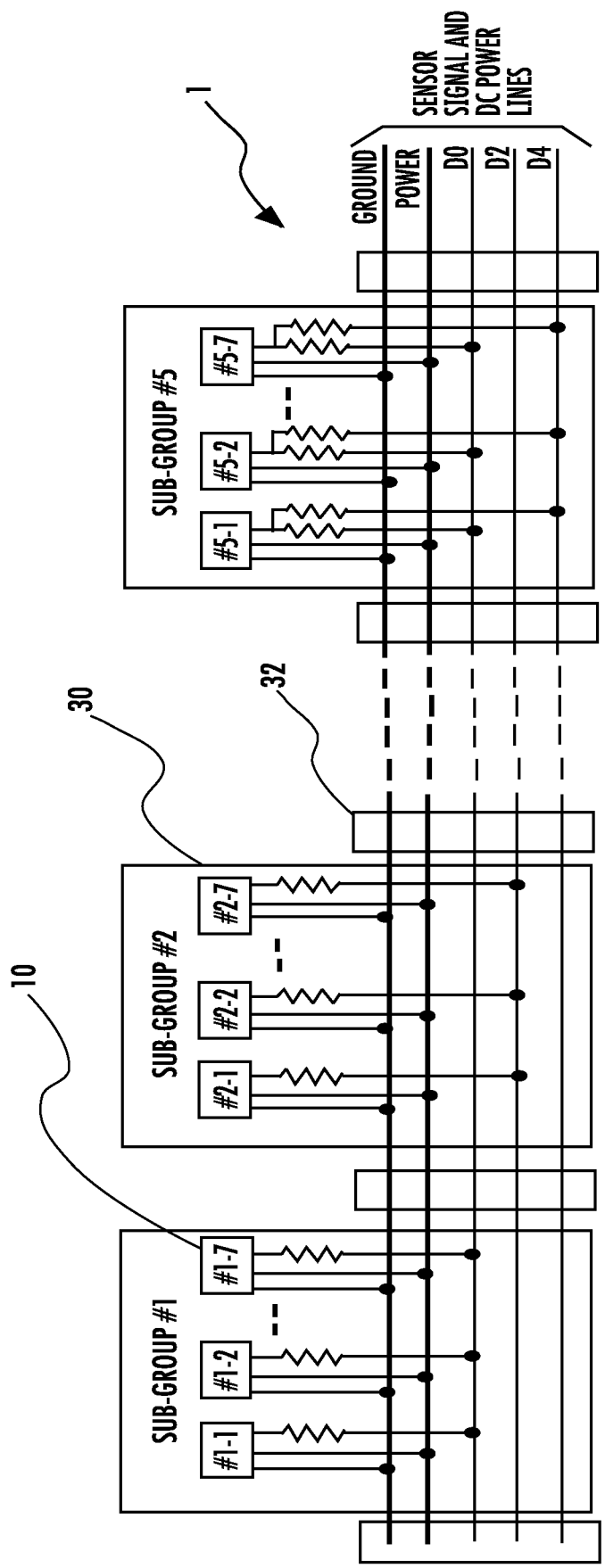
FIGS. 16A-16C show the connection of several sub-groups to form a sensor array according to different embodiments.

FIG. 16A shows one embodiment using sub-groups 30. In this embodiment, each sub-group 30 is made up of 7 pressure sensors 10. The number of pressure sensors 10 within a sub-group 30 is not limited. All pressure sensors 10 within a sub-group 30 are connected in parallel, such that they all make the same connections with the signal lines (D0, D2 and D4). In other words, if any of the pressure sensors 10 in Sub-group #5 is actuated, the D0 and D4 signals will be asserted. Likewise, any of the pressure sensors in Sub-group #2 is assert the D2 signal. In other words, the configuration of each sub-group is unique, such that it can be readily determined which sub-group detected the pressure. The sub-groups 30 may be connected together via connectors 32. Further, while FIG. 16A shows the connections for three-wire sensors, similar configurations may be achieved for two-wire sensors.

Figure 16B:
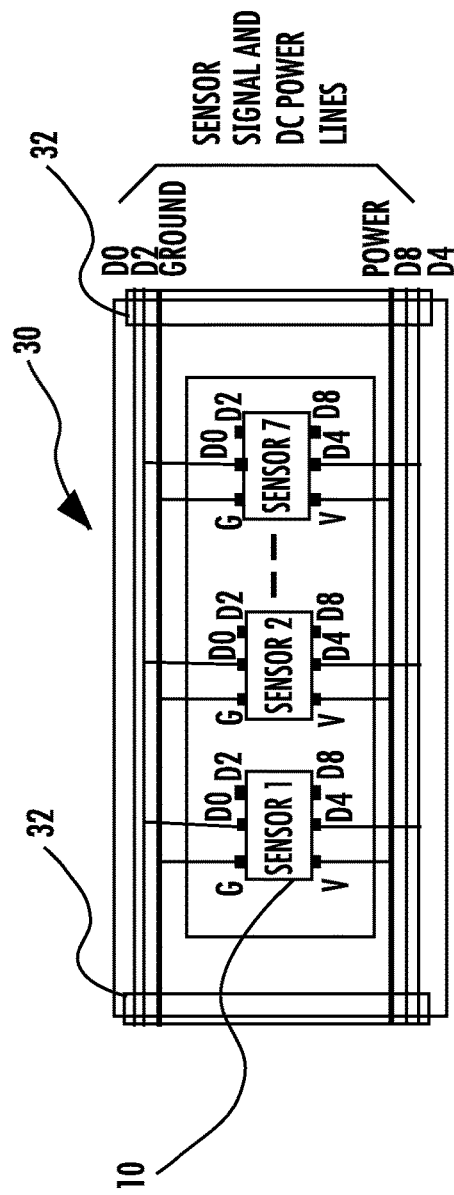
Figure 16C:
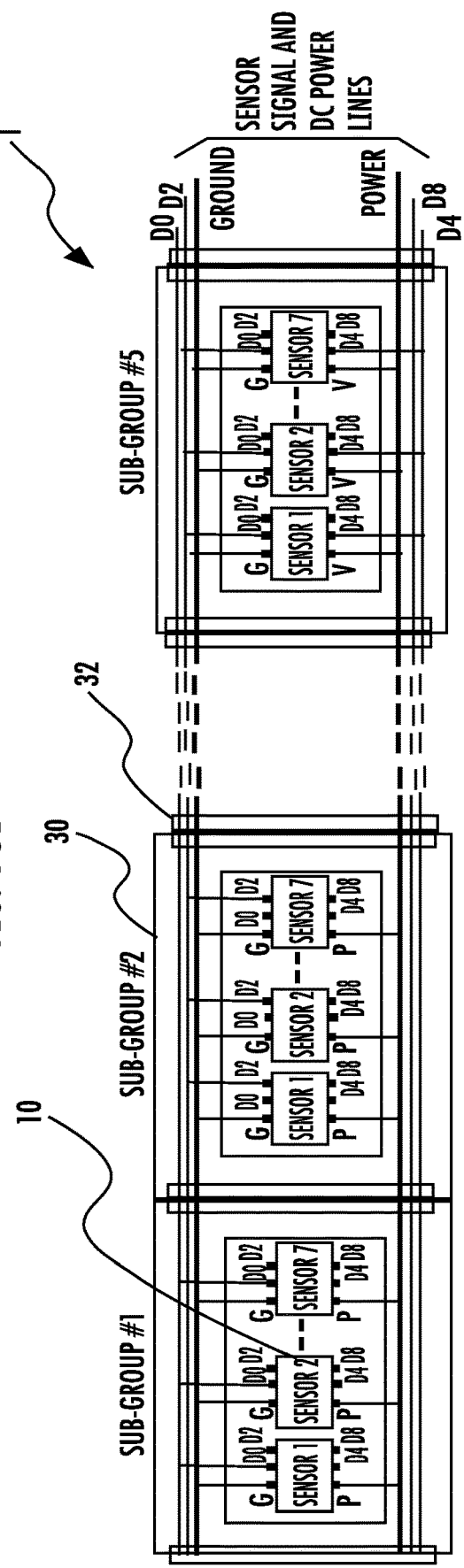

FIG. 16B shows a sub-group 30 made up of pressure sensors 10 that have 6 wires; power, ground and four output signals. In certain embodiments, the pressure sensor 10 may be a packaged device. The internal design may be similar to that shown in FIG. 16A, where the isolation resistors are included in the package and there are four signal wires, rather than the three shown in FIG. 16A. The number of the signal wires or the pins on the package depends on the number of sensors or the sub-groups to be identified by the sensor array. All of the pressure sensor 10 within the sub-group 30 are similarly wired. A connector 32 is disposed on each end of the sub-group 30. FIG. 16C shows a plurality of sub-groups (as shown in FIG. 16B) connected together. Note that the pressure sensors 10 in each sub-group 30 are wired in the same manner, but differently than every other sub-group 30.

Thus, each sub-group 30 provides an indication that it detected the pressure wave. In certain embodiments, if the sub-groups are connected as shown in FIG. 4C or 15C, that indication may be the assertion of a single signal. If the sub-groups are connected as shown in FIG. 4B, 15B or 16C, the indication may be the assertion of one or more shared signals.

In order to detect responses from the pressure sensors from the coolant of a superconducting conductor, the sensor array 1 may be inserted, with the outer tube if used, in a coolant channel in a superconducting magnet conductor and/or power cable.

For a superconducting device, the pressure sensors 10 can be inserted in the cooling space, as shown in FIGS. 5A-5C. These figures show the cross-sections of three types of different conventional CICC superconducting cables. FIG. 5A shows a bundled single cable 20 in a square conduit 21 with a center coolant channel 22. FIG. 5B shows a multiple cabled conductor of six sub-cables 23 in a square conduit 24 with a center coolant channel 25a and six corner coolant channels 25b. FIG. 5C shows a rectangular conductor 26 with two coolant channels 27. In each embodiment, the superconducting cable commonly comprises many fine wires of about 1 mm to 10 mm width and 0.1 mm thickness tapes or about 1 mm diameter or less. The sensor array 1 is shown in each conductor in FIGS. 5A-5C. The sensor array 1 may be inserted in coolant channel. In the case of FIG. 5B, the sensor array 1 can be inserted in center coolant channel 25a, one of the corner coolant channels 25b, or both. In the case shown in FIG. 5C, the sensor array 1 can be inserted in one of the coolant channels 27. In other embodiments, a sensor array 1 may be inserted in both coolant channels 27. The conductor designs are not limited to those in FIG. 5A-5C. The sensor array can be mounted any cooling space of a superconducting device.

Thus, the present disclosure of a sensor array for use with a superconducting conductor or a superconducting magnet allows spatially continuous monitoring along a superconducting conductor or a magnetic conductor with a good spatial resolution by reducing the sensor separation Lx. In a case of gas coolant, such as helium or hydrogen gas, the sound pressure wave propagation speed is slower than that in liquid. Thus, the separation Lx may be reduced to achieve acceptable detection times.

Figure 6:
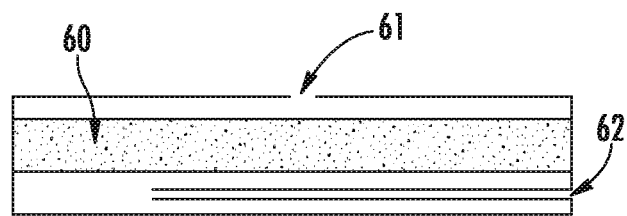
FIG. 6 is a cross-section of a sensor for a transient pressure wave in a high-pressure environment.

In one embodiment, a high-pressure application may employ a pressure sensor 60 having two sensing sides with differential paths as shown in FIG. 6. The pressure sensor may be any of the sensors described above. In this example, there are two paths 61, 62. Path 62 has, for example, a narrow long channel to produce a response to a pressure wave that may be delayed. In contrast, the path 61 is much shorter and therefore responds more quickly to a pressure signal. Thus, the transient response of the pressure sensor 60 first affects the path 61, since path 61 is shorter than path 62. Therefore, the pressure sensor 60 can detect a quick temporary sound wave. For a steady state of high pressure or low pressure in vacuum, both paths 61, 62 produce the same pressure to the pressure sensor 60. They are balanced and therefore produce no output signal. That is, the paths 61, 62 have different time responses, and therefore only a fast time dependent phenomena of a quick signal in a high-pressure environment, such as a quench of a superconducting magnet in a high-pressure coolant, can be detected. This type of pressure sensor 60 may be also used in vacuum. For cryogenic applications, the pressure sensor 60 may be made of materials for low temperature use. For magnetic field applications, the sensors 60 may be made of non-magnetic materials without strongly magnetic materials such as iron, nickel, non-magnetic stain-less steel, etc.

FIG. 7 shows a representative system that employs the sensor array 1 described herein to detect pressure waves due to events, such as changes in temperature that result in vaporization of the coolant 2. A sensor array 1 is disposed in a coolant 2 or mounted on a superconducting element 3. The sensor array 1 may have any suitable number of pressure sensors 10. The sensor array 1 may utilize any type of pressure sensor and may be configured in accordance with any of the embodiments described above. For example, in certain embodiments, there may be as few as one pressure sensor 10. In some embodiments, the sensor array may utilize sub-groups. The coolant 2 may be a liquid or gas, such as helium, hydrogen, nitrogen, or others. A superconducting element 3, such as a conductor or magnet, is also disposed in the coolant 2. The coolant 2, sensor array 1, and superconducting element 3 are all disposed in an enclosure 4. In certain embodiments, the enclosure may be one of the enclosures shown in FIGS. 5A-5C. Wires from the sensor array 1 may exit the enclosure 4 and attach to a controller 5. The controller 5 can be implemented in numerous ways, such as with dedicated hardware, or with general purpose hardware, such as a computer system, that is programmed using microcode or software to perform the functions recited herein. The controller 5 may comprise a processing unit and a local memory device. The local memory device may contain instructions, which, when executed by the processing unit, enable the system to perform the functions described herein. This local memory device may be a non-volatile memory, such as a FLASH ROM, an electrically erasable ROM or other suitable devices. In other embodiments, the local memory device may be a volatile memory, such as a RAM or DRAM. Additionally, the controller 5 may include a user input device, such as a keyboard, mouse, touch screen or another suitable device. The system may also include a display device, such as a computer screen, LED display, touch screen or the like. The user input device and the display device are all in communication with the processing unit.

The controller 5 receives the signals from the sensor array 1. While FIG. 7 shows each pressure sensor 10 having a dedicated signal wire in communication with the controller 5, the configuration of the signal wires may be as described in any of FIGS. 4A-4C, FIGS. 15A-15C or FIGS. 16A-16C. The controller 5 may detect whether any signal wire is actuated. The controller 5 may further determine which signal wire or wires are actuated in order to determine the location of the abnormal event. The controller evaluates the signals of each sensors and times of the signal received. From this information, the event location can be determined. The controller 5 may sample the signal wires at regular intervals, such as every millisecond. Of course, other sampling rates may also be used. In another embodiments, the signals wires may be treated as an interrupt, where any actuation of a signal wire causes the controller 5 to execute an interrupt routine to determine the location of the abnormal event.

In certain embodiments, two or more pressure sensors 10 of the sensor array 1 may detect the same event. Several different techniques may be used to detect the location of the event. In one embodiment, the controller 5 determines the first pressure sensor 10 which initially detects the event. The controller 5 then identifies the event as being near that first sensor. In another embodiment, the controller 5 determines the time that each pressure sensor 10 detected the event. It then uses the time that each pressure sensor 10 detected the event as well as the location of each pressure sensor 10 to more accurately pinpoint the location of the event. For example, assume that a first pressure sensor detects the event and a second pressure sensor detects the event 0.5 msec later. Also assume that Lx is 10 meters and the propagation rate in the coolant is 1400 m/s. From this information, it can be determined that the second pressure sensor is 0.7 m further from the event than the first sensor (0.5 msec*1400 m/s). If Lx is 10 m, then it can be determined that the event occurs 4.65 meters from the first pressure sensor and 5.35 meters from the second pressure sensor. In yet another embodiment, the controller may use the amplitude of each signal wire to help pinpoint the location of the event. In other embodiments, the controller 5 may use both time information and amplitude information to pinpoint the location of the event.

Further, it is also possible to utilize the sensor array 1 of the present disclosure in environments that do not employ a coolant fluid. For example, in certain embodiments, the sensor array 1 may be disposed in a vacuum. In this embodiment, the pressure sensors 10 may be mounted directly on the superconducting element.

For example, the pressure sensors 10 or the sensor array 1 may be mounted on the surface of the superconductor or the wall of the magnet winding for a bath-cooling condition of a bath cooled device or magnet. In other words, the sensor array 1 can be also used for a cryocooled dry superconducting magnet system that do not employ a coolant fluid. The sensor array 1 described herein can detect a pressure wave due to an abnormal event through transmission of the pressure wave through the magnet body. The use of a sensor array 1 made up of multiple pressure sensors makes it possible to pinpoint the location of an abnormal event.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for detecting events in a superconducting system, comprising:
   an enclosure;
   a coolant fluid disposed in the enclosure;
   a superconducting element disposed within the enclosure; and
   a sensor array disposed in the enclosure, wherein the sensor array is a linear array and detects an event in the superconducting element based on detecting pressure waves generated due to a temperature change by the event and transmitted in the coolant fluid.

2. The system of claim 1, wherein the coolant fluid is disposed in a coolant channel disposed in the superconducting element and the sensor array is disposed in the coolant channel.

3. The system of claim 1, wherein the coolant fluid comprises a liquid.

4. The system of claim 1, wherein the coolant fluid comprises a gas.

5. The system of claim 1, wherein the superconducting element comprises a superconducting conductor or a superconducting magnet.

6. The system of claim 1, wherein the superconducting element comprises a bundled cable with a center coolant channel, wherein the sensor array is disposed in the center coolant channel.

7. The system of claim 1, wherein the superconducting element comprises a multiple cabled conductor of sub-cables with a center coolant channel, wherein the sensor array is disposed in the center coolant channel.

8. The system of claim 1, wherein the superconducting element comprises a rectangular conductor with coolant channels disposed on the side of the superconducting element, and wherein the sensor array is disposed at least in one of the coolant channels.

9. The system of claim 1, wherein the sensor array comprises one or more pressure sensors; wherein the pressure sensors are selected from the group consisting of acoustic sensors, MEMS switches, continuous pressure sensors, force sensitive resistors, and soft potentiometers.

10. The system of claim 1, wherein the sensor array is disposed within a flexible, non-porous outer tube, such that the pressure waves deflect the outer tube to allow the pressure wave to be detected by the sensor array.

11. The system of claim 10, wherein an interior of the outer tube is pressurized at a same pressure as the pressure of the coolant fluid.

12. A system for determining a location of a thermal event in a superconducting system, comprising:
   an enclosure;
   a coolant fluid disposed in the enclosure;
   a superconducting element disposed within the coolant fluid; and
   a sensor array disposed in the coolant fluid, the sensor array comprising a linear array of a plurality of pressure sensors, wherein one or more of the plurality of pressure sensors in the sensor array detects the thermal event in the superconducting element based on detecting pressure waves generated due to a temperature change by the thermal event and transmitted in the coolant fluid, and a location of the thermal event is determined based on which one of the plurality of pressure sensors first detects the pressure waves.

13. The system of claim 12, wherein the linear array comprises equally spaced pressure sensors.

14. The system of claim 12, further comprising a controller, wherein outputs of the sensor array are in communication with the controller.

15. The system of claim 14, wherein each of the plurality of pressure sensors has an optical fiber cable in communication with the controller.

16. The system of claim 12, wherein the outputs of the plurality of pressure sensors are combined into a smaller number of wires, wherein a combination of wires are actuated if an event is detected and the combination of wires that is actuated is indicative of the pressure sensor that detected the event first.

17. The system of claim 12, wherein the sensor array comprises a plurality of sub-groups, wherein each sub-group supplies an indication that a pressure wave was detected by the sub-group.

18. The system of claim 17, wherein at least one of the sub-groups comprises a plurality of pressure sensors connected in parallel.

19. The system of claim 17, wherein at least one of the sub-groups comprises a continuous pressure sensor.

20. The system of claim 17, wherein the outputs of the plurality of sub-groups are combined into a smaller number of wires, wherein a combination of 41 wires are actuated if an event is detected and the combination of wires that is actuated is indicative of the sub-group that detected the event first.

* * * * *